US012632080B2

(12) United States Patent
Chao et al.

(10) Patent No.: US 12,632,080 B2
(45) Date of Patent: May 19, 2026

(54) APPLICATION DETECTION METHOD AND ASSOCIATED NON-TRANSITORY MACHINE-READABLE MEDIUM

(71) Applicant: MEDIATEK INC., Hsin-Chu (TW)

(72) Inventors: Chen-Ting Chao, Hsinchu City (TW);
Cheng-Han Tsai, Hsinchu City (TW);
Hong-Ruei Jhang, Hsinchu City (TW);
Chang-Long Wu, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 148 days.

(21) Appl. No.: 18/767,999

(22) Filed: Jul. 10, 2024

(65) Prior Publication Data

US 2026/0016852 A1     Jan. 15, 2026

(51) Int. Cl.
*G06F 1/08*          (2006.01)
(52) U.S. Cl.
CPC ..................................... *G06F 1/08* (2013.01)

(58) Field of Classification Search
CPC ....................................................... G06F 1/08
See application file for complete search history.

(56) References Cited

U.S. PATENT DOCUMENTS

| | | | |
|---|---|---|---|
| 2021/0271287 A1* | 9/2021 | Jose ...................... | G06F 9/4837 |
| 2025/0013493 A1* | 1/2025 | Macnamara .......... | G06F 9/4881 |
| 2025/0155955 A1* | 5/2025 | Yue ......................... | G06F 1/329 |

* cited by examiner

*Primary Examiner* — Stefan Stoynov
(74) *Attorney, Agent, or Firm* — Winston Hsu

(57) ABSTRACT

An application (APP) detection method includes: after an APP is launched, obtaining a process identifier (PID) corresponding to the APP from a first library; performing a calling operation upon an application programming interface (API) according to the PID; in response to the calling operation, collecting kernel information corresponding to the APP from a second library according to the PID; and performing a prediction operation by executing a K-nearest neighbors (KNN) algorithm according to the kernel information, to generate a prediction result, wherein the prediction result indicates a type of the APP.

18 Claims, 4 Drawing Sheets

APPLICATION DETECTION METHOD AND ASSOCIATED NON-TRANSITORY MACHINE-READABLE MEDIUM

BACKGROUND

The present invention is related to application (APP) detection, and more particularly, to an APP detection method that can generate a prediction result according to a running APP by executing an algorithm, for automatically determining a type of the running APP and dynamically adjusting a frequency of a processing circuit of an electronic device.

With the development of technology, more and more different types of APPs run on an electronic device (e.g., a smartphone). Examples of the APPs may include, but are not limited to: gaming APPS, benchmark APPs, and third-party APPs. Running different APPs usually requires adjusting a frequency of a processing circuit (e.g., a central processing unit, CPU) of the electronic device. if the frequency of the processing circuit is incorrectly increased for an APP with low frequency requirements, and is incorrectly decreased for an APP with high frequency requirements, the user experience may be affected. As a result, a novel APP detection method that can generate a prediction result according to a running APP by executing an algorithm, for automatically determining a type of the running APP and dynamically adjusting the frequency of the processing circuit of the electronic device, is urgently needed.

SUMMARY

It is therefore one of the objectives of the present invention to provide an APP detection method that can generate a prediction result according to a running APP by executing an algorithm, for automatically determining a type of the running APP and dynamically adjusting a frequency of a processing circuit of an electronic device, and a non-transitory machine-readable medium for storing a program code that provides the APP detection when executed, to address the above-mentioned issues.

According to at least one embodiment of the present invention, an APP detection method is provided. The APP detection method comprises: after an APP is launched, obtaining a process identifier (PID) corresponding to the APP from a first library; performing a calling operation upon an application programming interface (API) according to the PID; in response to the calling operation, collecting kernel information corresponding to the APP from a second library according to the PID; and performing a prediction operation by executing a K-nearest neighbors (KNN) algorithm according to the kernel information, to generate a prediction result, wherein the prediction result indicates a type of the APP.

According to at least one embodiment of the present invention, a non-transitory machine-readable medium for storing a program code is provided. When loaded and executed by a processor, the program code instructs the processor to execute a plurality of software modules comprising a controller, a data collector, and a predictor. After an APP is launched, the controller is arranged to obtain a PID corresponding to the APP from a first library, and perform a calling operation upon an API according to the PID. The data collector is arranged to collect kernel information corresponding to the APP from a second library according to the PID in response to the calling operation. The predictor is arranged to perform a prediction operation by executing a KNN algorithm according to the kernel information, to generate a prediction result, wherein the prediction result indicates a type of the APP.

One of the benefits of the present invention is that, by the APP detection method proposed by the present invention, when an APP is launched, a type of the APP may be automatically detected with a high accuracy by executing a KNN algorithm. In addition, in response to a prediction result of the KNN algorithm, a frequency of a processor (e.g., a CPU) can be dynamically adjusted according to the prediction result, so that the overall performance of an electronic device on which the APP runs can be improved, and quality of service (QoS) and performance requirements can be met.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . .".

Figure 1:
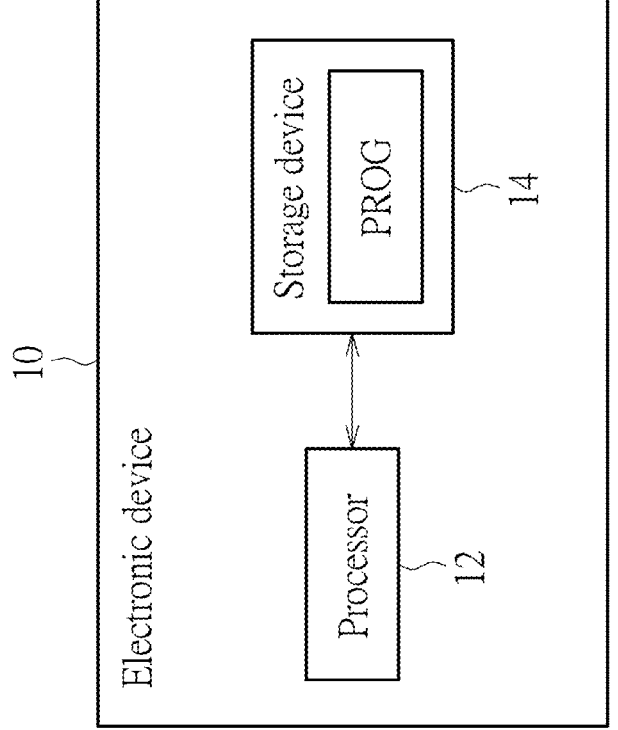
FIG. 1 is a diagram illustrating an electronic device according to an embodiment of the present invention.

FIG. 1 is a diagram illustrating an electronic device 10 according to an embodiment of the present invention. By way of example, but not limitation, the electronic device 10 may be a portable device such as a smartphone or a tablet. The electronic device 10 may include a processor 12 and a storage device 14. The processor 12 may be a single-core processor or a multi-core processor. For example, the processor 12 may be a central processing unit (CPU) or other types of processing unit (e.g., a graphics processing unit). The storage device 14 is a non-transitory machine-readable medium, and is arranged to store computer program code PROG. The processor 12 is equipped with software execution capability. The computer program code PROG may include multiple algorithms (e.g., a K-nearest neighbors (KNN) algorithm). When loaded and executed by the processor 12, the computer program code PROG instructs the processor 12 to perform an application (APP) detection method as proposed by the present invention. The electronic device 10 may be regarded as a computer system using a computer program product that includes a computer-readable medium containing the computer program code PROG.

That is, the APP detection method of the present invention may be embodied on the electronic device 10.

Figure 2:
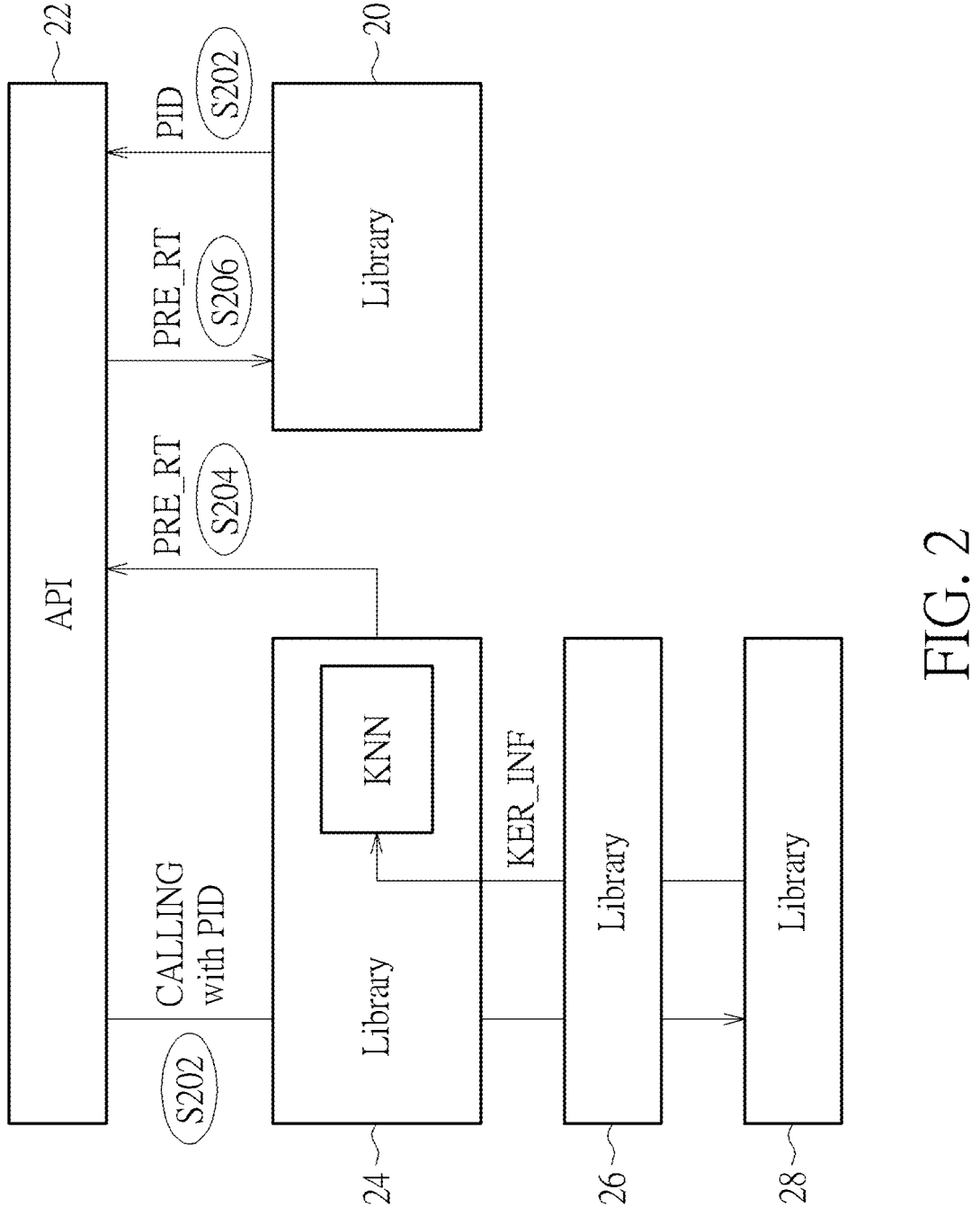
FIG. 2 is a diagram illustrating a processing flow of APP detection according to an embodiment of the present invention.

FIG. 2 is a diagram illustrating a processing flow of APP detection according to an embodiment of the present invention. Provided that the result is substantially the same, the steps are not required to be executed in the exact order shown in FIG. 2. For example, the processing flow shown in FIG. 2 may be employed by the processor 12 shown in FIG. 1.

In Step S200, after an APP is launched, a process identifier (PID) corresponding to the APP may be obtained from a library 20, for parsing kernel information when the APP is launched in subsequent processing, wherein the library 20 may be associated with an application programming interface (API) 22, and may include some functions for adjusting a frequency of the processor 20 (e.g., the CPU).

In Step S202, after the PID is obtained, a calling operation may be performed upon the API 22 according to the PID to obtain kernel information KER INF corresponding to the APP from some libraries in a kernel space (labeled as "CALLING with PID" in FIG. 2). For example, in response to the calling operation, the kernel information KER INF may be collected from libraries 26 and 28 in the kernel space according to the PID. The kernel information KER INF may include multiple system call counts when the APP is launched, and the multiple system call counts correspond to different system calls, respectively. For example, the kernel information KER INF may include a count of system calls related to input/output (IO) control (e.g., syscell: ioctl), a count of system calls related to a sleep mode (e.g., syscell: nanosleep), a count of system calls related to read/write command (e.g., syscell: write ( )), and so on. These system call counts may be used to determine a type of the APP in the subsequent processing. In addition, the libraries 26 and 28 may be associated with a berkeley packet filter (BPF; which may also be regarded as an extended BPF (eBPF)) in a kernel space (e.g., may be provided by the BPF), wherein the kernel information KER INF is obtained from the library 26, and data access to the library 28 is prohibited.

In Step S204, a prediction operation is performed by executing the KNN algorithm according to the kernel information KER INF, to generate a prediction result PRE RT, wherein the prediction result RE RT indicates a type of the APP. Specifically, the KNN algorithm and a KNN model may be included in a library 24, and the KNN model is pre-trained according to at least one predetermined APP to generate a trained KNN model (e.g., the KNN model may be pre-trained according to system call counts of the at least one predetermined APP when the at least one predetermined APP is launched). The kernel information KER INF is input into the trained model as input data for executing the KNN algorithm, to generate the prediction result PRE RT. In this embodiment, the prediction result PRE RT may further indicate whether the type of the APP is equal to that of the at least one predetermined APP, but the present invention is not limited thereto. In some embodiments, the prediction result PRE RT may further indicate whether the APP is the same as the at least one predetermined APP (e.g., whether the APP is the same version or different versions of the at least one predetermined APP).

In Step S206, a frequency of the processor 20 (e.g., the CPU) may be dynamically adjusted according to the prediction result PRE RT, to improve the overall performance of the electronic device 10 and meet quality of service (QOS) and performance requirements. For example, in response to the type of the APP requiring a higher frequency, the frequency of the processor 20 may be increased. In response to the type of the APP requiring a lower frequency, the frequency of the processor 20 may be decreased.

Figure 3:
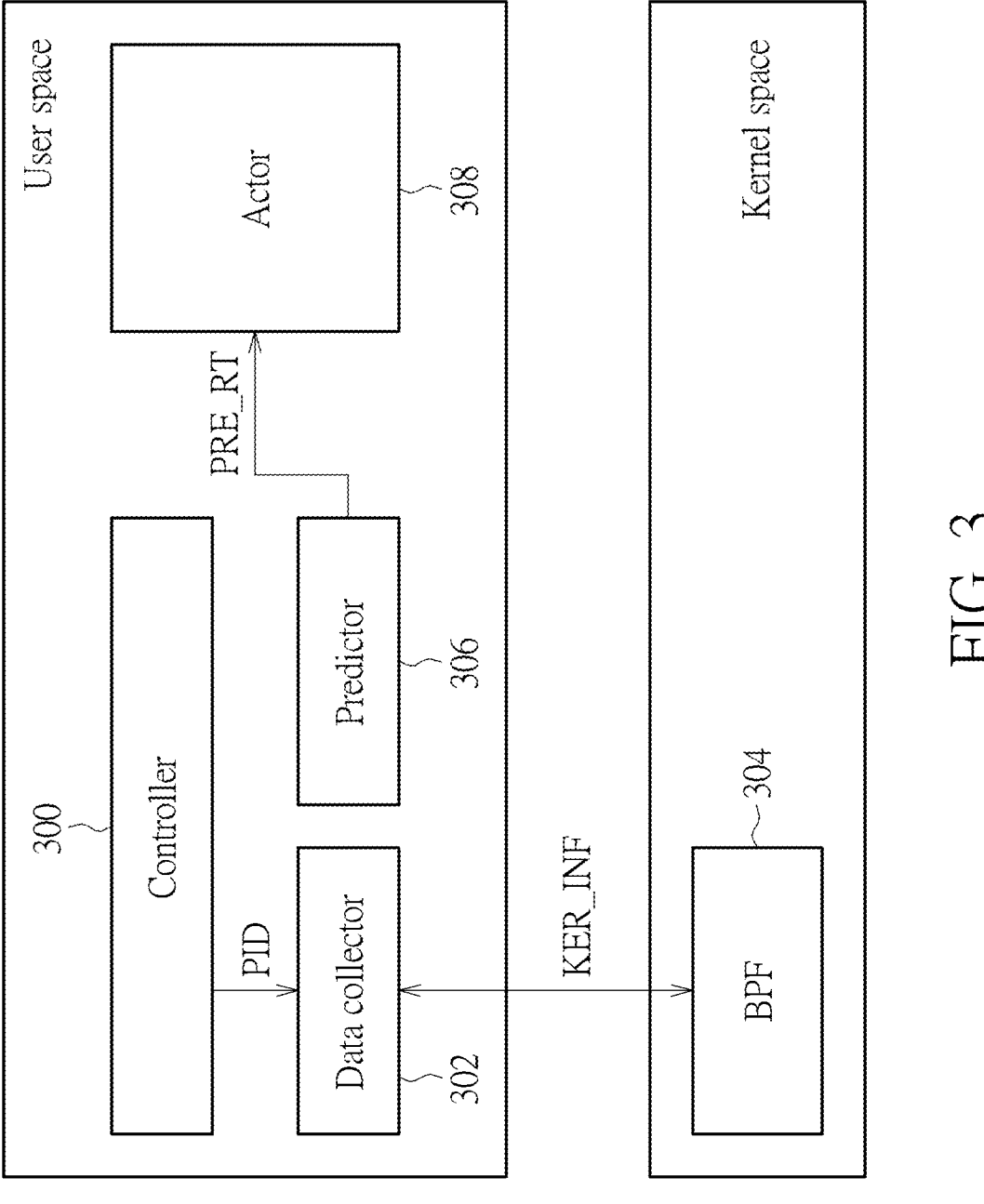
FIG. 3 is a diagram illustrating associated software modules of the processing flow shown in FIG. 2 according to an embodiment of the present invention.

FIG. 3 is a diagram illustrating associated software modules of the processing flow shown in FIG. 2 according to an embodiment of the present invention. As shown in FIG. 3, when loaded and executed by the processor 12, the computer program code PROG instructs the processor 12 to execute a plurality of software modules, including a controller 300, a data collector 302, a BPF 304, a predictor 306, and an actor 308, wherein the controller 300, the data collector 302, the predictor 306, and the actor 308 are in a user space, and the BPF 304 is in a kernel space. The controller 300 may be arranged to process foreground threads of the APP to obtain the PID of the APP (e.g., the Step S200 shown in FIG. 2 may be executed by the controller 300). The data collector 302 may be arranged to receive the PID from the controller 300, and communicate with the BPF 304 to start to perform a collection operation regarding the kernel information KER INF of the APP according to the PID (e.g., the Step S202 shown in FIG. 2 may be executed by the data collector 302). The predictor 306 may be arranged to receive the kernel information KER INF from the data collector, and perform a prediction operation by executing the KNN algorithm according to the kernel information KER INF, to generate the prediction result PRE RT (e.g., the Step S204 shown in FIG. 2 may be executed by the predictor 306). The actor 308 may be arranged to receive the prediction result PRE RT from the predictor 306, and adjust the frequency of the processor 20 (e.g., the CPU) according to the prediction result PRE RT, to improve the overall performance of the electronic device 10 and meet QoS and performance requirements (e.g., the Step S206 shown in FIG. 2 may be executed by the actor 308). For brevity, similar descriptions are not repeated in detail here.

Figure 4:
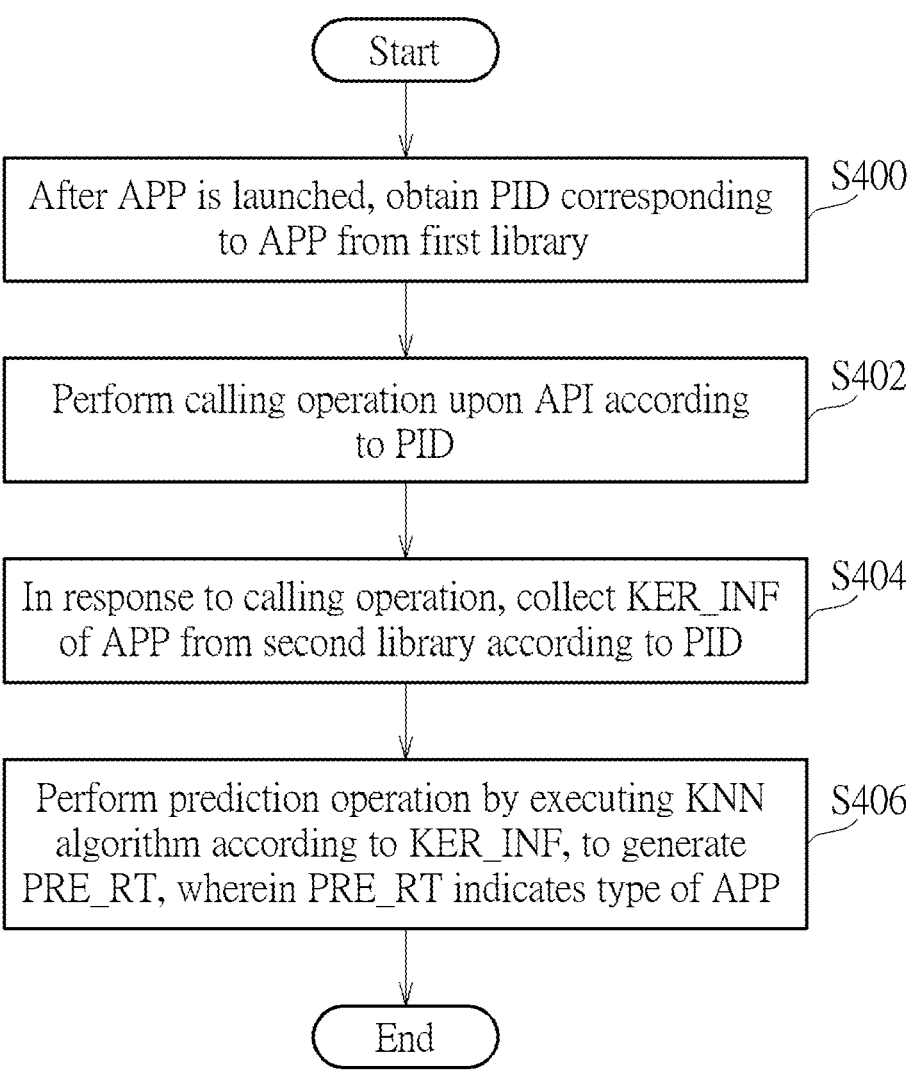
FIG. 4 is a diagram illustrating a flow chart of an APP detection method according to an embodiment of the present invention.

FIG. 4 is a diagram illustrating a flow chart of an APP detection method according to an embodiment of the present invention. Provided that the result is substantially the same, the steps are not required to be executed in the exact order shown in FIG. 4. For example, the APP detection method may be performed by the processor 12 shown in FIG. 1.

In Step S400, after an APP is launched, a PID corresponding to the APP is obtained from a first library.

In Step S402, a calling operation is performed upon an API according to the PID.

In Step S404, in response to the calling operation, kernel information KER INF of the APP is collected from a second library according to the PID.

In Step S406, a prediction operation is performed by executing a KNN algorithm according to the kernel information KER INF, to generate a prediction result PRE RT, wherein the prediction result PRE RT indicates a type of the APP.

Since a person skilled in the pertinent art can readily understand details of the steps after reading above paragraphs, further description is omitted here for brevity.

In Summary, by the APP detection method proposed by the present invention, when an APP is launched, a type of the APP may be automatically detected with a high accuracy by executing a KNN algorithm. In addition, in response to a prediction result of the KNN algorithm, a frequency of a processor (e.g., a CPU) can be dynamically adjusted according to the prediction result, so that the overall performance of an electronic device on which the APP runs can be improved, and QOS and performance requirements can be met.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An application (APP) detection method, comprising:
after an APP is launched, obtaining a process identifier (PID) corresponding to the APP from a first library;
performing a calling operation upon an application programming interface (API) according to the PID;
in response to the calling operation, collecting kernel information corresponding to the APP from a second library according to the PID; and
performing a prediction operation by executing a K-nearest neighbors (KNN) algorithm according to the kernel information, to generate a prediction result, wherein the prediction result indicates a type of the APP.

2. The APP detection method of claim 1, further comprising:
adjusting a frequency of a processing circuit according to the prediction result.

3. The APP detection method of claim 2, wherein the processing circuit is a central processing unit (CPU).

4. The APP detection method of claim 1, wherein the kernel information comprises multiple system call counts when the APP is launched, and the multiple system call counts correspond to different system calls, respectively.

5. The APP detection method of claim 1, wherein the step of performing the prediction operation by executing the KNN algorithm according to the kernel information, to generate the prediction result further comprises:
pre-training a model according to at least one predetermined APP, to generate a trained model; and
inputting the kernel information of the APP into the trained model as input data for executing the KNN algorithm, to generate the prediction result.

6. The APP detection method of claim 5, wherein the prediction result further indicates whether the type of the APP is equal to a type of the at least one predetermined APP.

7. The APP detection method of claim 5, wherein the prediction result further indicates whether the APP is the same as the at least one predetermined APP.

8. The APP detection method of claim 1, wherein the first library is associated with the API.

9. The APP detection method of claim 1, wherein the second library is associated with a berkeley packet filter (BPF) in a kernel space.

10. A non-transitory machine-readable medium for storing a program code, wherein when loaded and executed by a processor, the program code instructs the processor to execute a plurality of software modules comprising:
a controller, wherein after an application (APP) is launched, the controller is arranged to obtain a process identifier (PID) corresponding to the APP from a first library, and perform a calling operation upon an application programming interface (API) according to the PID;
a data collector, arranged to collect kernel information corresponding to the APP from a second library according to the PID in response to the calling operation; and
a predictor, arranged to perform a prediction operation by executing a K-nearest neighbors (KNN) algorithm according to the kernel information, to generate a prediction result, wherein the prediction result indicates a type of the APP.

11. The non-transitory machine-readable medium of claim 10, wherein the plurality of software modules further comprises:
an actor, arranged to adjust a frequency of a processing circuit according to the prediction result.

12. The non-transitory machine-readable medium of claim 11, wherein the processing circuit is a central processing unit (CPU).

13. The non-transitory machine-readable medium of claim 10, wherein the kernel information comprises multiple system call counts when the APP is launched, and the multiple system call counts correspond to different system calls, respectively.

14. The non-transitory machine-readable medium of claim 10, wherein the predictor is further arranged to:
pre-train a model according to at least one predetermined APP, to generate a trained model; and
input the kernel information of the APP into the trained model as input data for executing the KNN algorithm, to generate the prediction result.

15. The non-transitory machine-readable medium of claim 14, wherein the prediction result further indicates whether the type of the APP is equal to a type of the at least one predetermined APP.

16. The non-transitory machine-readable medium of claim 14, wherein the prediction result further indicates whether the APP is the same as the at least one predetermined APP.

17. The non-transitory machine-readable medium of claim 10, wherein the first library is associated with the API.

18. The non-transitory machine-readable medium of claim 10, wherein the second library is associated with a berkeley packet filter (BPF) in a kernel space.

* * * * *